Oct. 21, 1969  TAMAKI TOMITA ET AL  3,474,315
APPARATUS FOR AUTOMATIC PROGRAM CONTROL OF A MACHINE TOOL
Filed Dec. 14, 1967  7 Sheets-Sheet 1

INVENTORS
TAMAKI TOMITA,
YOSHIO SHIMA,
HIROAKI SUGIURA,
BY
Berman, Davidson & Berman
ATTORNEYS.

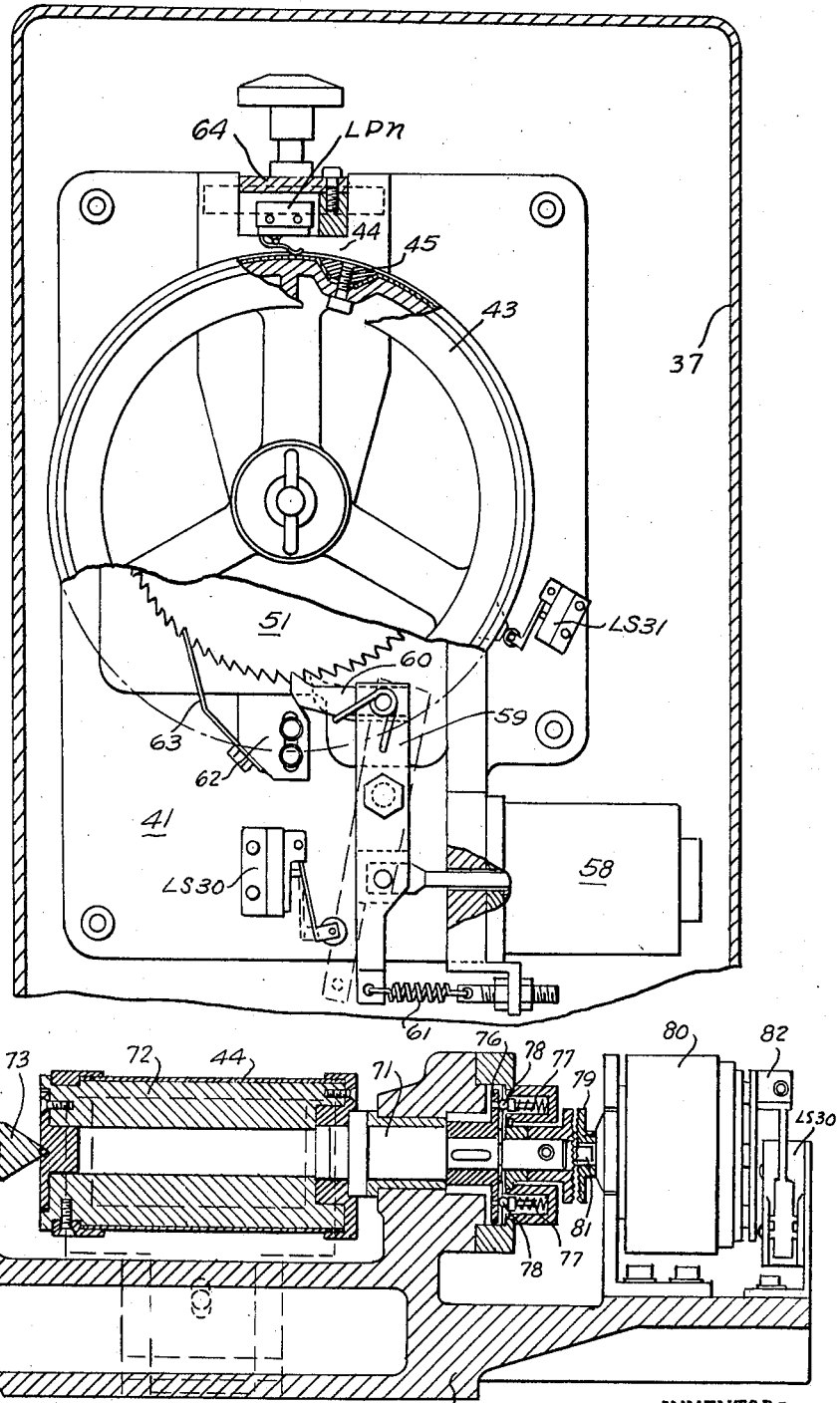

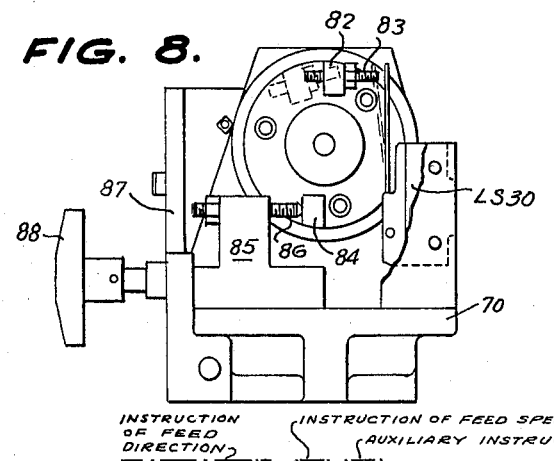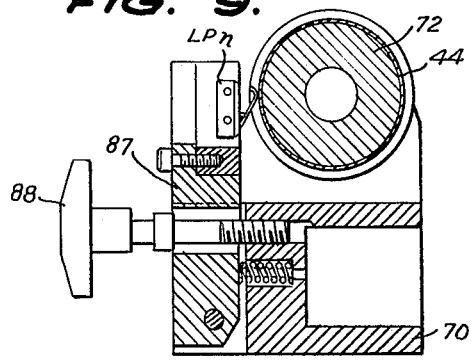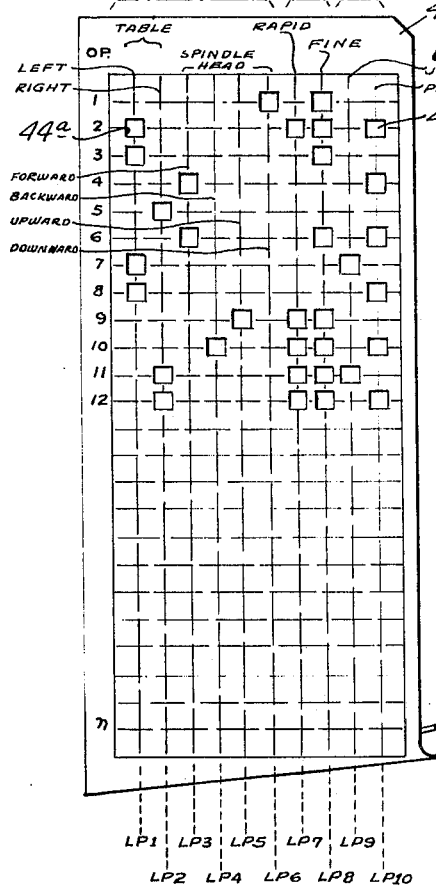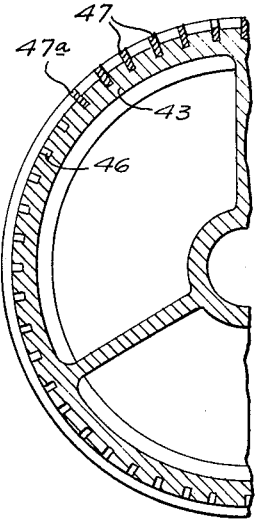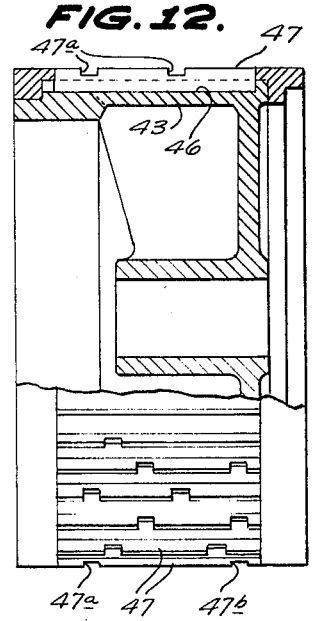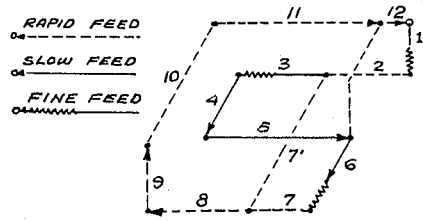

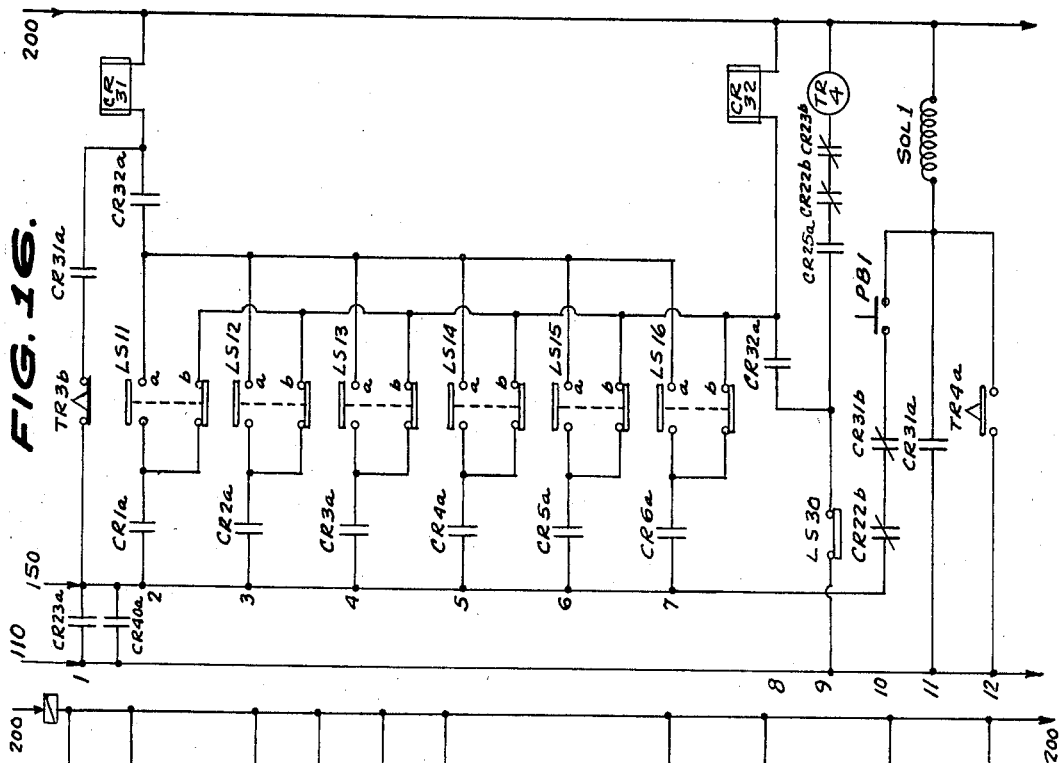
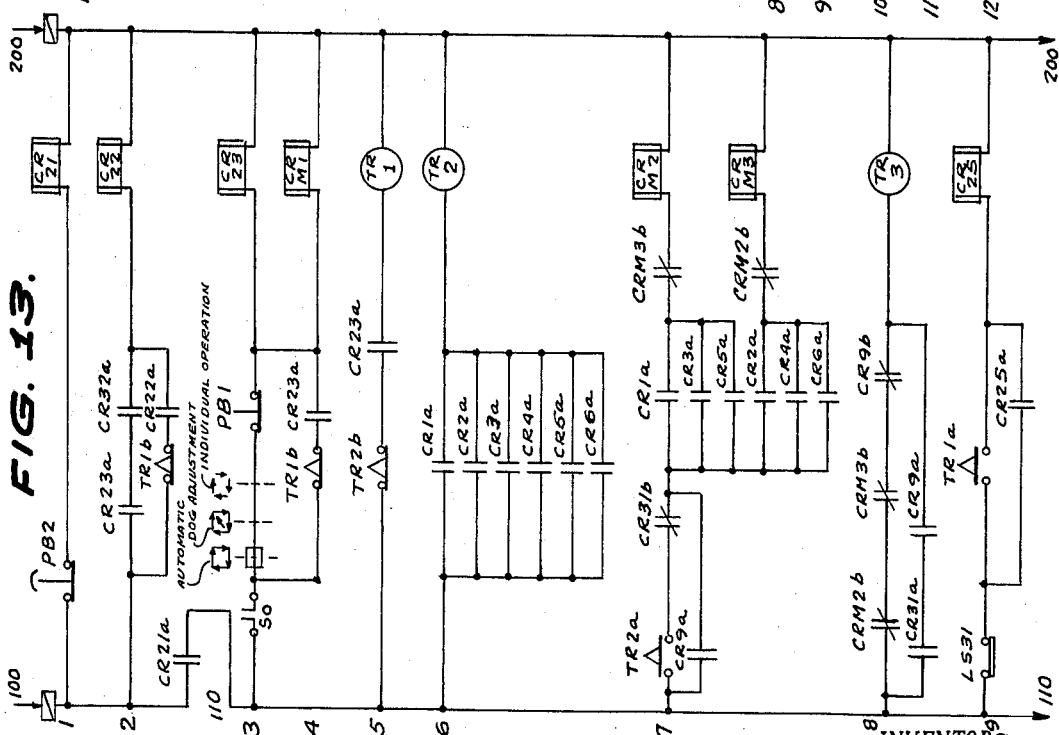

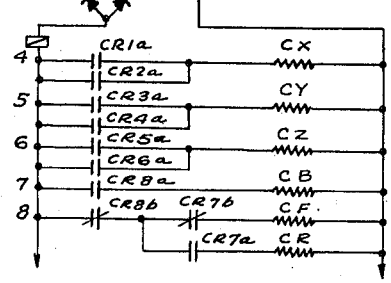

United States Patent Office 3,474,315
Patented Oct. 21, 1969

3,474,315
APPARATUS FOR AUTOMATIC PROGRAM
CONTROL OF A MACHINE TOOL
Tamaki Tomita, Yoshio Shima, and Hiroaki Sugiura,
Kariya-shi, Japan, assignors to Toyoda Koki Kabushiki
Kaisha (Toyoda Machine Works Ltd.), Kariya-shi,
Japan, a corporation of Japan
Filed Dec. 14, 1967, Ser. No. 690,466
Claims priority, application Japan, Dec. 28, 1966,
42/855
Int. Cl. H02p 7/00, 7/22
U.S. Cl. 318—162
9 Claims

ABSTRACT OF THE DISCLOSURE

Apparatus for automatic control of a machine tool comprising a drum, means for rotating said drum step-by-step to expose successive operation instructions of a program, a set of instruction reading switches arranged for actuation by the program on the drum, guides supported for movement with the movable elements, such as cutter supporting means and table, in directions parallel to their feeds, a set of dogs adjustable along each of said guides and fixable thereon at predetermined distances from a reference index, a stationary set of switches for each of said set of dogs adapted to be actuated in response to contact with said dogs during movements of the latter, and electric circuit means connecting all of said sets of switches to drive means whereby actuation of instruction reading switches cause initiation, direction and speed of feed, and actuation of switches actuated by the dogs cause changes of speed and stoppage, of said movable elements and step-advance of said drum.

---

The present invention relates to a program control apparatus for controlling the sequential motions of the movable elements of a machine tool, or the like, and provides for the advance of stored program instructions containing a predetermined operational sequence, along the surface of a drum successively and step-by-step, so as to command and control, through microswitches responding to such instructions, of a work-holding table, a spindlehead, a cutting tool, etc., while ensuring the safety of operation and preventing mis-operation of the machine and its attachments.

What is generally most important in a program controlled machine tool is to automatically check and confirm whether it is permissible to complete a previous operation and to pass on to the next, but due to the fact that, in a traditional machine tool, one cutter for which the operations are determined in prearranged order, is actuated by a single instruction, this has not been possible. To the best of applicants' knowledge, there has never been in existence a program-controlled machine tool in which direct checking of individual operations during transition of a program can be made before energizing the complete operation instructive circuit into action.

In hitherto well-known program-controlled machine tools, it is customary to use a board called a "program board" in which holes are bored as if on a checkerboard. To each hole is fitted a jack constituting an electric contact, and a plug is inserted to each jack to effect the selection of its operation. Transition from operation-to-operation is performed electrically by rotary switches. If, for instance, there are 11 kinds of operation instruction elements and it is required to effect 48 operations, such traditional apparatus will need 528 jacks. As all the jacks constitute electric contacts, there is a high frequency of mis-contact. Moreover, as the rotary switches have many electric contacts, the troubles will be increased. Because the transition of programs is effected electrically, once a fault, or error, occurs in one operation, as from trouble in the rotary switches, all subsequent operations will proceed to complete a faulty workpiece, which is wasteful of time and material.

Certain conventional program-controlled machine tools are provided with dogs to command the transition of a program as well as to control the stop positions for feed operations. Positioning and adjustment of these dogs have been a most complicated operation requiring the highest skill. It is customary to measure the positions of the work table, etc., as stopped by the dogs, and to readjust and correct the positions of the dogs after detecting errors by such measurements. Correct positioning requires repeating several times the readjustment of the dog positions.

In the traditional program control devices, once the stopping of feed has been commanded by the dogs, the program passes on to the next operation, and so, repetition of the same operation to adjust the dogs is extremely difficult, if at all possible, and necessitates complicated and very time-consuming actions.

It is a primary object of the present invention to provide apparatus which will eliminate the foregoing shortcomings of conventional program control apparatus.

Another important object of the invention is to provide program control apparatus for a machine tool which restricts electric contacts to a minimum, and greatly decreases resulting troubles arising out of faulty contacts.

It is a further object of the invention to provide a drum for carrying the program instructions together with means for positively stopping the drum to prevent false program operations.

It is yet another object of the invention to provide an improved program control apparatus, having the above described characteristics, embodying a protective circuit during rapid feed and an interlock protective circuit which prevents command of opposed feed instructions.

Yet another object of the invention is to provide an improved program control apparatus, having the above mentioned characteristics, constructed to enable stopping the work table, etc., at the end of each stroke for the readjustment of the dogs and in which the same stroke may be repeated by manual lever control to facilitate the precise and repeated readjustment of the dogs.

Still another object of the invention is to provide apparatus which facilitates the adjustment of positions of the dogs controlling the stop positions of each feed operation.

Yet a further object of the invention is to provide automatic control apparatus, having the above described characteristics, wherein means is provided for jumping over a dog intended to control a previous operation, whereby a great many operations can be automatically sequenced without mutual interference by their respective control dogs, and without improper mid-stroke stop of the feed.

Still another object of the invention is to provide automatic control apparatus, having the above described characteristics, wherein means is provided to ensure that the step-advance mechanism is positively advanced in each step before the next operation will start.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 5 is an elevational view taken in the direction of the arrowhead A of FIG. 4, and showing the details of the step-advancing mechanism, partly in section;

FIGS. 6–9 show another embodiment of the program step-advancing device, FIG. 6 being a front elevation, FIG. 7 a longitudinal section, FIG. 8 a side elevation viewed from the arrowhead B of FIG. 6, and FIG. 9 a sectional view along the line 9—9 of FIG. 6;

FIG. 10 is a plan view showing a card bearing a punched program and suitable for use with the apparatus of the invention;

FIG. 11 is a diagram showing an operation cycle, or program, controlled by the punch card of FIG. 10;

FIG. 12 is an elevation, partly in section, of another embodiment of a program step-advancing device;

FIG. 12a is a partial sectional view of the device of FIG. 12; and

FIGS. 13–17 are the electric control circuit diagrams, whereof FIG. 13 is the start/stop circuit for the machine, FIG. 14 is the program operation selecting circuit, FIG. 15 is the circuit for confirming the step-advance of a program, FIG. 16 is the circuit for controlling the step-advance of a program, and FIG. 17 is the circuit for control of the clutches for changing feed directions and speeds.

The rightward or leftward advance of the table 3 shall be called the "right and left feed" of the table, and the screw 13, or other device for causing this motion will be called the "right and left feed device." Similarly, the raising and lowering of the spindle-head 6 relative to the table 3 will be called the "up and down feed" of the spindle-head, and the advance and retreat of the spindle-head relative to the table will be called the "back and forth feed" of the spindle-head. The devices engendering these movements are to be called, respectively, the "spindle-head up-down feed" device, and "spindle-head back and forth feed" device.

Figure 2:
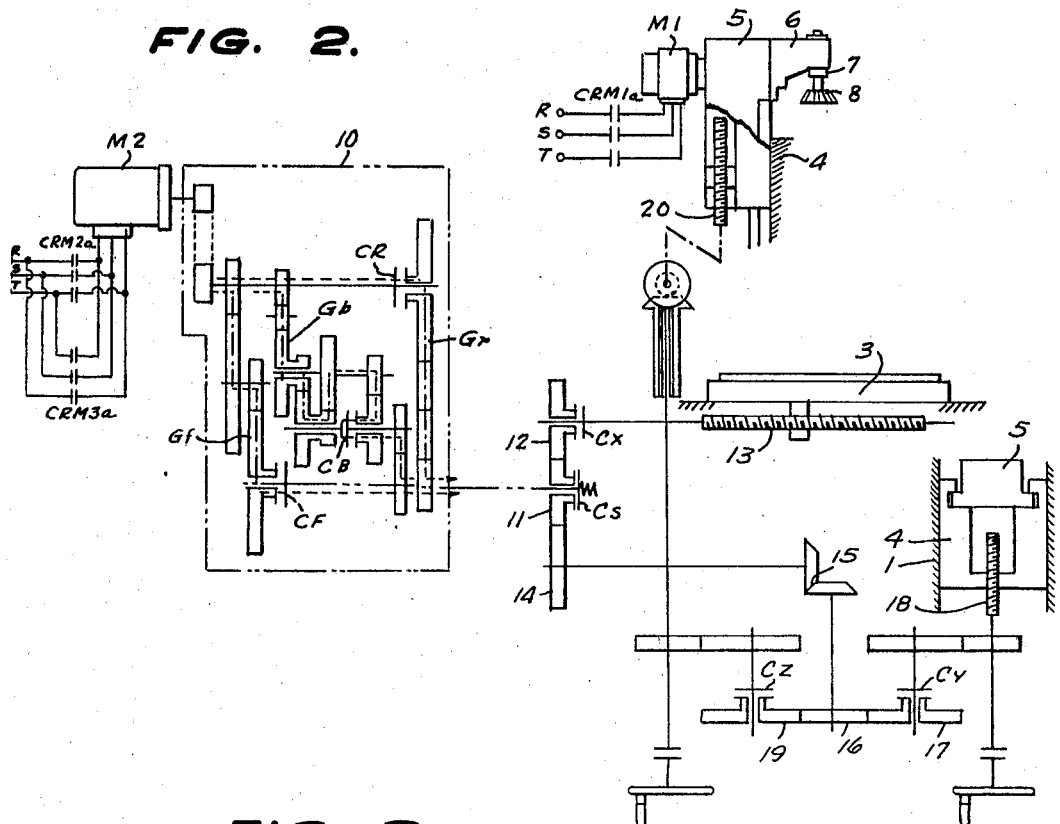
FIG. 2 is a diagram showing the drive system of the machine tool of FIG. 1.

FIG. 2 shows diagrammatically the drive systems for the above devices. The main feed drive extends from the motor M2, controlled by relay contacts $crm2a$ and $crm3a$, through the change-speed gear box 10 and, thence, one branch goes, through the medium of the overload safety clutch CS, to the gear 12, the table right and left feed selective clutch CX and then to the table right and left feed device 13, while the other branch includes the gears 14, 15, 16 and is further divided into a sub-branch including the gear 17, spindle-head back and forth feed selective clutch CY and the spindle-head back and forth feed device 18, and a second sub-branch including the gear 19, spindle-head up-down feed selective clutch CZ, and the spindle-head up-down feed device 20. The previously mentioned change-speed gear box 10 is provided with a rapid feed gear set $Gr$, a slow feed gear set $Gf$, and a fine feed gear set $Gb$ selected by the rapid feed clutch CR, the slow feed clutch CF, and the fine feed clutch CB. The relations between the operating condition of these clutches to the feed speed and the feed direction are shown in Table 1.

TABLE 1

| Feed direction | Feed speed | Direction of rotation of feed motor M2 | Change-direction operating clutch | Change speed operating clutch |
| --- | --- | --- | --- | --- |
| Table left | Rapid feed | Regular rotation | CX | CR |
|  | Slow feed | do | CX | CF |
|  | Fine feed | do | CX | CB |
| Table right | Rapid feed | Reverse rotation | CX | CR |
|  | Slow feed | do | CX | CF |
|  | Fine feed | do | CX | CB |
| Spindle-head forward | Rapid feed | Regular rotation | CY | CR |
|  | Slow feed | do | CY | CF |
|  | Fine feed | do | CY | CB |
| Spindle-head backward | Rapid feed | Reverse rotation | CY | CR |
|  | Slow feed | do | CY | CF |
|  | Fine feed | do | CY | CB |
| Spindle-head upward | Rapid feed | Regular rotation | CZ | CR |
|  | Slow feed | do | CZ | CF |
|  | Fine feed | do | CZ | CB |
| Spindle-head downward | Rapid feed | Reverse rotation | CZ | CR |
|  | Slow feed | do | CZ | CF |
|  | Fine feed | do | CZ | CB |

THE MACHINE TOOL AND ATTACHED RAILS AND DOGS

Figure 1:
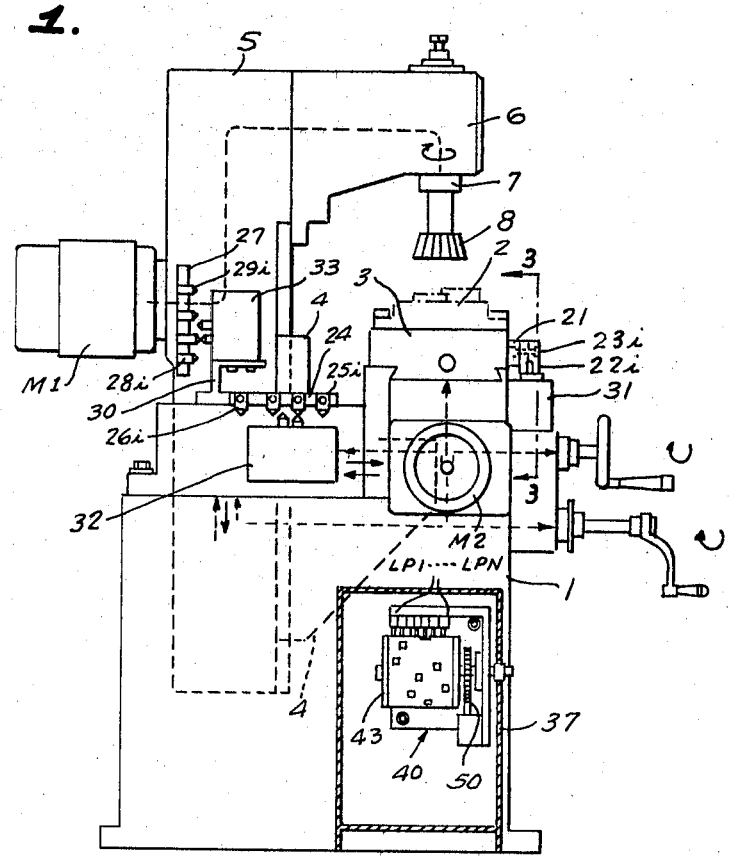
FIG. 1 is a side elevation of a machine tool equipped with the apparatus according to the invention and shown partially in section.

Referring now more particularly to the drawings, the apparatus according to the invention is attached to and incorporated in a standard milling machine as shown in FIGS. 1 and 2. It should be understood that such machine is complete and operative in all respects even though certain elements remain unmentioned and unreferenced herein. The work-holder, or table 3, supports the work 2 and is mounted to slide on base 1 to the right and left, that is, in directions at right angle to and out of and into the paper as viewed in FIG. 1. The internal knee 4, FIG. 2, guideably slides in crossways from and toward the table 2 hereinafter to be called back-and-forth directions. The spindle-head column 5 is mounted on the knee 4 to slide at an angle to the sliding direction of the internal knee 4, that is, in the up-and-down direction relative to the workpiece 2. On column 5 is mounted the spindle-head 6, and the spindle 7 journaled in head 6 and holding the milling cutter 8. This tool is rotated, through a gear box (not shown), by the electric motor M1.

It should be noted that Table 1 is applicable where a single feed motor is used. If for each of the feed devices an independent feed motor is used, clutches CX, CY, and CZ become unnecessary.

Figure 3:
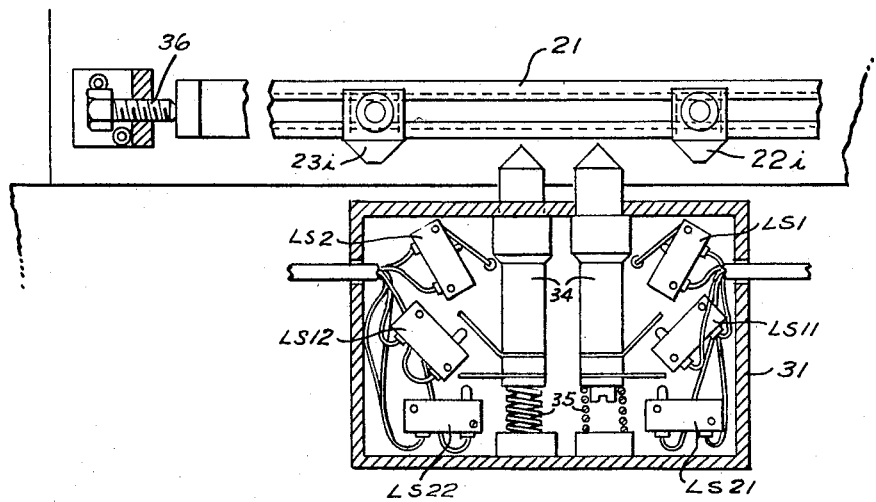
FIG. 3 is a sectional view taken along the line 3—3 of FIG. 1, showing the relation between the dog rail and the microswitch box.

On one side of the table 3 is secured, parallel to the feed direction of the table, a guide, or dog rail 21, FIGS. 1 and 3. On this rail two sets of dogs, 22a–22i and 23a–23i are movably mounted for shifting to suitable positions at preselected distances from a reference index, not shown, where they may be fixed. On one side of the internal knee 4 is secured by set screws, or the like, a dog rail 24, on which two sets of movable dogs, 25a–25i and 26a–26i are slidably mounted for fixing at set distances from an index position. Similarly, on the side of the column 5 is secured a dog rail 27 having the sets of movable dogs, 28a–28i and 29a–29i fixable thereon. In positions opposed to the dog rails 21, 24 and 27 are fixed stationary micro-switch boxes 31, 32, 33 either directly on the base, or on a suitable bracket such as 30 which is protrudingly fitted on the base.

The set of dogs, 22a–22i on the dog rail 21 commands either the stop of the leftward feed or the fine feed of the table 3. The number of the dogs corresponds to the number of times the leftward shift of the table 3 is to occur in the complete program, and the position of each dog sets the stop point distance from an index, or reference, position. In those programs calling for movements such that the space between two dogs would be too small, special narrow dogs may be used, or an additional dog rail may be provided for cooperation with an added switch set.

The other set of dogs, 23a–23i on the same rail 21 commands the stop of the rightward feed or commands the fine feed of the table 3. The number and positions of the dogs are prescribed in the same way as for the above mentioned set of dogs 22a–22i.

In a similar manner, the sets of dogs 25a–25i and 26a–26i on the rail 24 are positioned and fixed for controlling the forward feed and backward feed of the spindle-head, and the sets of dogs 28a–28i and 29a–29i on the rail 27 are positioned and secured for controlling the upward and downward feed of the spindle-head. Each dog rail, as a unit, is adapted to be adjusted to a fine degree by, for example, a screw such as 36, so as to compensate for the abrasion with wear of the milling cutter 8.

THE CONTROL SWITCHES

Between the sets of dogs 22a–22i and 23a–23i, between the sets 25a–25i and 26a–26i, and also between the sets 28a–28i and 29a–29i are respectively provided spaces, so that each of the set of dogs will contact only one of the motion-responsive levers which actuate the micro-switches in an associated switch box.

The construction of the micro-switch box 31 is shown in FIG. 3. The boxes 32 and 33 are of the same, or very similar construction.

In the micro-switch box 31 are two motion-responsive levers 34, projecting outwardly through an aperture by the force of springs 35, in directions perpendicular to the rail 21, and adapted to be contacted by the dogs 22i, 23i, for example, fixed to and moving with the rail. Such contact will press one or the other inwardly depending on direction of movement of the rail, and thereby actuates the micro-switches mounted on the corresponding side of the box. The micro-switches LS1, LS2 mounted in the top row control the fine feed; the switches in the middle row control the stop of feed, and those in the bottom row protect against overfeeding, all being operable in the stated order. The controls exercised by the micro-switches in all three switch boxes are shown in Table 2.

TABLE 2

|  | For fine feed | For stop of operation | Protection against over feeding |
|---|---|---|---|
| Left feed of table | LS1 | LS11 | LS21 |
| Right feed of table | LS2 | LS12 | LS22 |
| Forward feed of spindle-head | LS3 | LS13 | LS23 |
| Backward feed of spindle-head | LS4 | LS14 | LS24 |
| Upward feed of spindle-head | LS5 | LS15 | LS25 |
| Downward feed of spindle-head | LS6 | LS16 | LS26 |

PROGRAM STEP-ADVANCING MECHANISM

A program step-advancing device 40 is provided in the control box 37 on the side of the machine tool, as shown in FIG. 1, and is composed of the rotary drum 43 which stores program commands, a mechanism 50 for step-advance of the rotary drum, and a set of limit switches LP1–LPn which read and respond to the program instructions.

Detailed construction of the device 40 will be explained by referring to FIGS. 4 and 5. On a base 41 housed in the container of device 40 is rotatably journaled the shaft 42. The rotary drum 43 is detachably mounted at one end of shaft 42 in an overhung manner to make it easily detachable. Around drum 43 is placed an instruction member, such as the punch card 44, both ends of which are held down by set clamps 45, FIG. 5. Instead of placing the punch card 44 around the drum 43, it serves equally well to form slender, axial grooves 46 in the outer surface of the drum and insert plates 47 having notches 47a, as is shown in FIGS. 12 and 12a.

The card 44 or plate 47 has punch holes 44a, or notches 47a, provided at predetermined places, each of which provides an operation instruction, the punch holes or notches for a single operation appearing in one transverse line on the card as numbered 1–12 in the left margin, FIG. 10.

On the aforementioned shaft 42 a ratchet gear 51 is mounted rotatably, and a clutch 52 engages this gear 51 by the teeth 51a. The clutch is axially slidable on the shaft 42, and prevented from rotation by the key 48. On the end of the shaft 42, a knob 53 is slidably fitted for operating the clutch. The pin 54 provided on knob 53 is engaged in an L-shaped groove 55 on the shaft 42, to adjust the position of the knob 53 relative to the shaft 42. Coil springs 56, 57 are respectively inserted and compressed on both sides of the clutch 52, whereby it is possible to engage or disengage the clutch 52 by advancing or retracting the knob 53. If the knob 53 is turned while the clutch 52 is disengaged, the drum 43 can be rotated to any desired point, so that manual stepping and positioning of the drum can be effected, as well as operation of the clutch, by the single knob. When the clutch 52 is engaged, the ratchet gear 51 becomes integrated with the drum 43. Step-advance of the ratchet gear 51 is thus effected each time the electromagnet 58, FIG. 5, is energized and de-energized. The lever 59, pivoted to the base 41 turns to draw the pawl 60 to its dotted-line position shown in FIG. 5 when the magnet is energized, and when the electromagnet is de-energized the lever, by force of the spring 61, moves the lever to the full-line position, the pawl moving the ratchet gear 51 a pitch length or one tooth clockwise, before the pawl strikes the stop 62. The spring pawl 63 prevents inverse movement during stepping of the drum. The micro-switch LS30 acts to confirm the motion of the lever 59. The other micro-switch LS31 acts to confirm return to the original, or index, position of the drum.

One end of the supporting lever 64, which holds the set of limit switches LP1–LPn parallel to the surface of drum 43, is pivoted to the base 41 on pivot 64', so that when the drum 43 is to be detached the lever can be tilted slightly to space the actuators of the limit switches away from the punch card 44, and thus avoid interference with drum removal. The engaging flange 65 provided at the tip of the supporting lever 64 ensures that the drum 43 cannot be detached without the supporting lever 64 first being tilted. The set of limit switches LP1–LPn is detachably fixed on the supporting lever 64 and the switch actuators are in contact with the punch card 44 surrounding the drum 43. The number of the limit switches in set LP1–LPn may be equal to or greater than the number of instruction elements or punch holes which may appear in a single transverse line defining an operation of the punch card. In the case of the punch card 44 shown in FIG. 10, ten limit switches are necessary as indicated below the card.

The thickness of the punch card 44 should be slightly greater than the on-off travel of each actuator of the switches LP1–LPn. The longitudinal rows of the punch card 44 contain holes in which direct operations to be performed, such as the rightward or leftward feed of the table, the rapid, slow or fine feed of the spindle-head in up-down or back-forth direction, the "dog passing-by system" to prevent a mid-stroke stop, and the protection to ensure that unless the drum 43 is positively advanced by one pitch the next motion step-advance is not effected. Each transverse row of punch holes in the card dictates the commands for the above motions involved in a single operation and movement from one transverse row to the next dictates the sequencing of the operations in a program. In the positions corresponding to the movement to be commanded in each operation, or transverse line, are provided holes 41a into which will be pushed the tips of the respective actuators of the limit switches LP1–LPn. The spaces between the longitudinal rows of the punch card correspond to the spaces between the limit switches. When plates 47 shown in FIG. 12 are used, their upper sides includes notches 47a for the same purpose as the aforementioned punch holes. A safety protection row is provided with the holes 44b for step-advance, and which appear alternately, in line with LP10, for every other operation.

The operation cycle of the punch card 44 shown in FIG. 10 is diagrammatically shown by FIG. 11, with reference numerals corresponding to those of the transverse lines on the punch card. Thus, the first operation instructs the downward feed of the spindle-head, the second operation instructs the leftward rapid feed of the table. The remaining ten operations are directed by the lines 3–12 at the end of which the machine elements are returned to their initial positions, completing the program of twelve operations.

Figure 6:
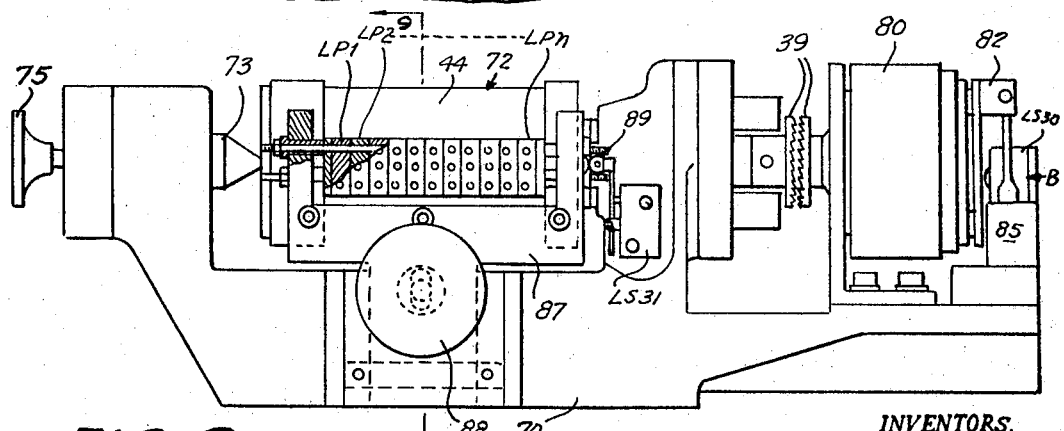

In FIGS. 6–9 is shown, by way of example, another embodiment of the program step-advancing device. The drum 72 is rotatably mounted at one end by shaft 71 journaled in the body 70 and received at the other end by the center 73 under pressure of the spring 74. When the knob 75 is pulled, the center 73 is retracted, so that the drum 72 can be easily detached. The shaft 71 rotates in unison with the drum 72, to which is keyed an indexing plate 76. Against the side of the indexing plate 76, there is a ball 78 compressed by the spring 77 to control the indexing angles. On the tip of the shaft 71 is fixed one member of the claw-clutch 79, the other member of the clutch being secured on the rotary shaft 81 of the rotary solenoid 80, so that both members of the clutch face each other in corresponding relation, but in disengaged condition. When the rotary solenoid 80 is energized, its shaft 81 advances both rotatingly and in the axial direction to engage the clutch 79 and rotate the shaft 71 a determined angle, to step-advance the drum 71 a unit pitch. When the rotary solenoid is de-energized, the shaft 81 retreats axially, rotating inversely, so that the clutch is disengaged. Thus, by repeated energization and deenergization of the solenoid 80, the drum 72 is intermittently advanced step-by-step in one direction. On the opposite end of the rotary solenoid 80 are mounted two abutments 82, 84, FIG. 8, which oscillate with the solenoid shaft. The projection 83 screwed to one of the abutments actuates the micro-switch LS30 to confirm the operation of the solenoid 80. The other abutment 84 comes in striking contact with the stop 86 screwed on the support 85, to control the angle of rotation of the shaft 81. The set of limit switches LP1–LPn, FIG. 6, is provided, in the same manner as previously described, on a supporting lever 87. The actuators for the set are in contact with the punch card 44 surrounding the drum 72, but by loosening the screw 88, FIG. 9, they can be tilted and spaced from the drum to avoid interference when the drum 72 is removed or replaced. The micro-switch LS31 operable by the projection 89, FIG. 6, on one end of the drum 72 serves to confirm the original or indexing position of the drum for replacement.

Figure 4:
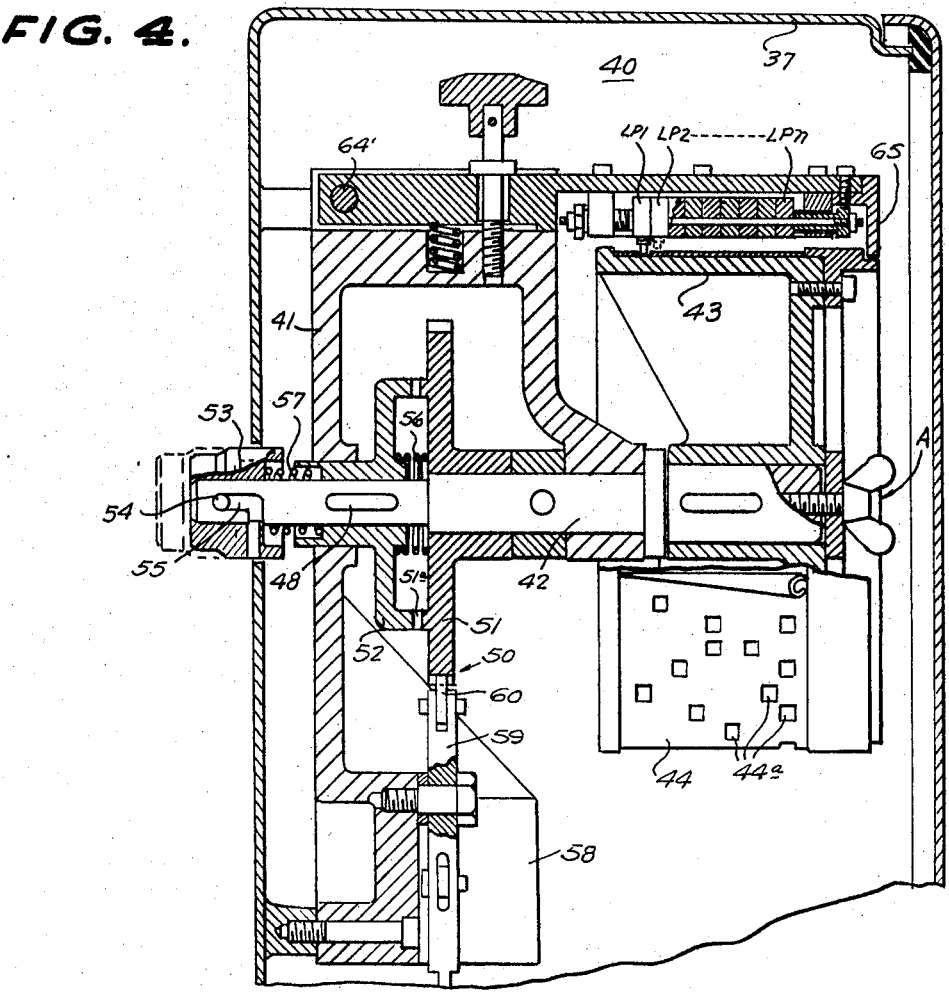
FIG. 4 is a partial longitudinal sectional view showing an embodiment of the drum-type program step-advancing device.

The step-advance device of FIGS. 6–9 differs from the previously described device of FIGS. 4 and 5 mainly in that it uses a rotary solenoid for step-advancing and in that it has a different indexing and supporting mechanism for the drum, but it nevertheless performs the same function, being more applicable where the number of operations to be controlled is comparatively small.

ELECTRIC CONTROL CIRCUITS

In explaining the electric control circuits for the program control apparatus, the symbols used in the circuit diagrams are defined as follows: CR signifies a relay coil, and TR a timer coil. The contacts of the relay and timer are shown by corresponding small letters, the normally open contacts having the suffix a, and the normally closed contacts the suffix b. The letter S indicates a change-over switch and its contacts, the switch being operable to the selective positions shown on the right side thereof. Electric lines which have a common supply line from the electric source are given the same number.

START STOP CIRCUIT (FIG. 13)

The topmost line 1, FIG. 13, represents the emergency stop circuit. To the emergency stop button PB2 is connected in series the relay coil CR21, the contact cr21a of which is inserted into the electric wire 110 on the 3rd line and below to cut off all the circuits on and below the 3rd line in case of emergency stop, thus preventing the machine from passing on to the next motion.

The re-start circuit, on the 2nd line, includes contacts cr23a, cr32a and relay coil CR22 connected in series; a self-hold circuit is formed across the previous contacts by the contact tr1b, directing the end of a cycle and the relay contact cr22a. The re-start circuit, once energized, will not be de-energized unless the cycle is ended by opening of the timer contact. Deenergization of this circuit opens relay contact cr22b and prevents the step-advance circuit on the 10th line of FIG. 16 from being actuated.

On the 3rd and 4th lines are shown the automatic operation command circuits. A series circuit is formed by the changeover switch So, the start button PB1, and the relay coil CR23. A parallel, self-holding circuit across So and PB1 is formed by the contact cr23a and timer contact tr1b which directs the end of a cycle and is normally closed until the end of an automatic cycle. The relay coil CRM1 is connected in series with switch So and timer contact tr1b and relay contact cr23a. Note in FIG. 2 that spindle motor M1, which rotates the milling cutter 8, is controlled by relay contact crm1a.

The 5th line has a cycle end directing circuit, in which the contacts tr2b and cr23a are connected in series with the timer coil TR1, to stop an automatic cycle, when directed by the line 3 circuit and when the main feed motor, controlled by the circuit of line 6, is not started after a determined period of time.

On the 6th line is the start directing circuit for the feed motor M2, which incluudes a set of feed command contacts scr1a–cr6a in parallel and connected in series with the timer coil TR2. Operation of this circuit will be apparent from subsequent description of FIG. 14.

The 7th line is the command circuit for the normal and inverse rotations of the feed motor M2. The above mentioned timer contact tr2a and the contact cr31b, directing the stop of feed, are connected in series, with two branches, one of which is formed by the contact crm3b and relay coil CRM2 for commanding the normal rotation of the feed motor in series with a set of parallel feed command contacts cr1a, cr3a, cr5a. The other branch is formed by contact crm2b in series with relay coil CRM3 for commanding the inverse rotation of the feed motor and a parallel set of the feed command contacts cr2a, cr4a, cr6a. The described 7th line circuit delays the start of the feed motor M2, for the period of time needed for the engaging and disengaging motions of a clutch, after the feed has been commanded by the start-directing circuit on the 6th line through delay in closing timer contact tr2a. Further, the contacts tr2a, cr31b are connected in parallel with the contact cr9a which is closed by the command for jump-over of the dogs to be described later, to hold the feed motor circuit energized and prevent the mid-stroke stop in one and the same feed direction.

The 8th line is the delay circuit for the feed motor at the time of change of the direction of motion. The series connection of contacts crm2b, crm3b and cr9b, shunted by the contacts cr31a and cr9a in series, is connected to the timer coil TR3 and across power lines 110 and 200. The contact tr3a of this timer is inserted in the holding circuit 55 of FIG. 14 and contact $tr3b$ is inserted in the step-advance directing circuit, 1st line of FIG. 16, thereby to delay the start of rotation of the motors M1 and M2 for a determined period of the time when change of the direction of motion is commanded.

The 9th line shows the circuit for return to original position of the drum 43. This embodies series connection of the contacts LS31, $tr1a$, and relay coil CR25. A holding circuit is formed by contact $cr25a$ across timer contacts $tr1a$. When the timer contact $tr1a$ is closed at the end of an automatic cycle, the relay coil CR25 is energized to actuate the step-advance circuit shown on the 9th line of FIG. 16.

PROGRAM OPERATION SELECTING CIRCUIT (FIG. 14)

The 1st line of FIG. 14 is a circuit which controls the circuits on the 2nd line and below. The automatic operation contact $cr23a$ is connected across lines 110 and 120 and in series with contacts $cr10a$ and $cr11a$ in parallel across the power lines 120 and 130, the last forming one power line for the 2nd line and below. The contacts $cr10a$, $cr11a$ are the contacts of the relay controlled by the step-advance confirming circuit of FIG. 15, to be described, and are adapted to keep the program selecting circuits from being actuated unless the step-advance of the program is positively effected.

The circuits from the 2nd line down to the 11th line are the control circuits for the motor M2. In these circuits, lines 2–7, the set of micro-switches LP1–LP6 which are in contact with the drum, the set of micro-switches LS21–LS26 in the micro-switch boxes, and the relay coils CR1–CR6 are connected respectively in series and extended through the $b$ contacts of certain of these relays to form an interlock circuit 54, so arranged that while one of the relay coils is energized it deenergizes all the other relay coils of this group. Two outputs of interlocking circuit 54 are respectively connected to two sets of the $a$ contacts of the same relays connected in parallel with the timer contact $tr3a$, and holding circuit 55. The two outputs of circuit 55 are connected to the rapid feed relay contact $cr7a$ and the spindle motor M1 operating contacts $crm1a$ respectively, completing the described lines 2–7 circuits across power lines 130 and 200. The circuits from the 2nd line to the 7th line are intended for the selection of the only one circuit under conditions where the rotation of the milling cutter 8 or the rapid feed is to be directed.

The 8th line shows the fine feed instruction circuit. The contacts $cr14b$, $cr7b$ and the relay coil CR8 are connected in series with the micro-switch LP8, and then to one side of each of the fine feed micro-swtiches LS1–LS6. The other sides of these switches are connected respectively to the relay coils CR1–CR6 of the feed control circuits in lines 2–7. The 8th line circuit is thus operative to change over to fine feed, a little before the positions in which the micro-switches LS1–LS6 activate so as to increase the accuracy of the stop of the workholder and tool.

The 9th line is a circuit formed by connecting the contacts $cr31b$, $cr32b$ and the relay coil CR14 in series, and in parallel with the contacts $cr14b$, $cr7b$, and the relay coil CR8 referred to above. The normally open relay contact $cr14a$ is connected across the relay contacts $cr31b$ and $cr32b$ to form a holding circuit. Should fine feed in the same direction be repeatedly selected by the fine feed micro-switch LP8 when one of the micro-switches LS1–LS6 is in actuated state the energization of relay CR14 will open contact $cr14b$, line 8, to de-energize the relay coil CR8 at the inception of the operation and thereby prevents fine feed.

The 10th line is the rapid feed instruction circuit, in which the series connection of the micro-switch LP7, the contact $cr23a$ and the relay coil CR7 is further series connected with the micro-switch LP8, line 8, to complete the circuit between lines 120, 200 and ensure that rapid feed is effected only when both the micro-switches LP7–LP8 are simultaneously closed.

The 11th line is a jump-over instruction circuit. The micro-switch LP9 is connected in series with the line relay coil CR9 between lines 130 and 200. When energized, relay CR9 closes the normally open contact $cr9a$ in the 7th line of FIG. 13 to hold this circuit even if the contact $cr31b$ is opened, and this prevents mid-stroke stop of the feed, as will be further explained.

The 12th to 17th lines of FIG. 14 show circuits for manual change of operation directions permitting individual operations and readjustment of dogs, as necessary. The contact $crSoa$ of switch $So$, line 18, manually closed at the time of individual operation, and the contact $cr40a$ are connected in parallel by the power lines 110 and 140. Line 140 is connected to one contact of each manual change-direction switch S1–S6, while the other contacts are respectively connected to the corresponding contacts of the operation instructive micro-switches LP1–LP6. Thus, when not in automatic operation, the movable elements, such as the table, can be advanced in any desired direction by manual operation of the change-direction switches $So$–$S6$ (the operation and choices for selection of the switch position being diagrammatically shown in broken lines and squares immediately to the right of the switches).

The 18th line is the dog readjustment circuit. The manual change-over switch $So$, in closed condition at the time of change-over for dog readjustment, the push button switch PB3, and the relay coil CR40 are connected in series between lines 110 and 200, and a self-hold circuit is formed by the contacts $cr40a$ and $cr31b$ in series across switch PB3. When relay coil CR40 is energized, the circuits from the 12th line down as well as the step-advancing instruction circuit of FIG. 16 are actuated, so that by manual operation of the change-direction switch, the table, or tool, can be advanced in any direction desired.

When, during the course of manual operation, any of the stop-feed micro-switches LS11–LS16, FIG. 16, is actuated by a predetermined dog, relay CR31 line 2, FIG. 16 is energized opening the contact $cr31b$ of the self-hold circuit, line 18, FIG. 14, to de-energize the relay coil CR40 and stop the feed. Repetition of one and the same feed operation can be effected as many times as desired by the operation of the push button switch PB3 and the appropriate change-direction switch. Furthermore, when the dog directs the stop feed, the feed is stopped, so that readjustment of the dog position can be effected easily by measuring the stop position of the table, or tool.

STEP-ADVANCING CONFIRMING CIRCUIT (FIG. 15)

Conventional program control apparatus often has the shortcoming that faults incidental to the limit switches, solenoids, etc., at the time of passage of one program operation to the next, may prevent the progress of the program, and as a result of which a grave accident may result. Such a shortcoming is prevented by the following:

One of the longitudinal rows on the punch card 44 or slit plates 47 wound around the drum 43 is reserved exclusively for safety protection. If the dimension of the punch card is large this row may well be punched to provide a hole for every one of the operations. In the exemplified embodiment described here and shown in FIG. 10 at line LP10, this row is punched with holes alternately, one for every second operation, and the actuator of the micro-switch LP10 is operated by these holes. In consequence, as the drum 43 rotates, the pair of contacts of micro-switch LP10 are opened and closed with each alternate operation of an even number.

Figure 15:
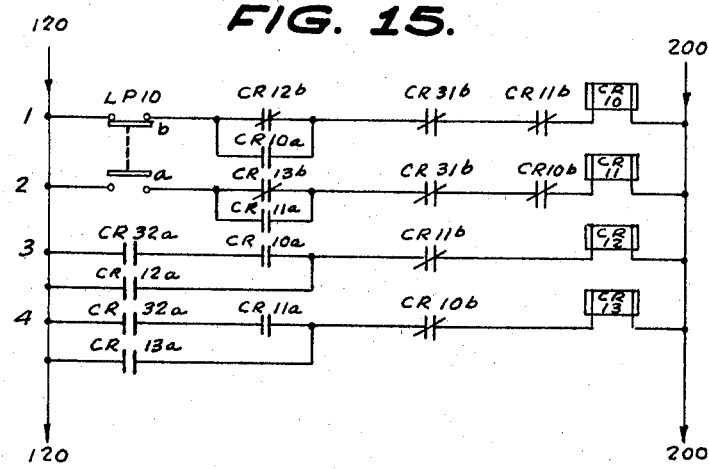

On the 1st line of the step-advance confirming circuit of FIG. 15, with the normally closed "$b$" contact of micro-switch LP10 are series connected the contacts cr12b, cr31b, cr11b, and the relay coil CR10 between lines 120 and 200, and in parallel with the contact cr12b is connected the self contact cr10a to form a hold circuit.

On the 2nd line, are similarly connected in series with the normally open "a" contact of the micro-switch LP10 the contacts cr13b, cr31b, cr10b, and the relay coil CR11, and in parallel with the contact cr13b is connected the contact cr11a, forming a hold circuit.

On the 3rd line the contacts cr32a, cr10a, cr11b, and the relay coil CR12 are connected in series, between the same power lines 120, 200, while, on the 4th line the contacts cr32a, cr11a, cr10b, and the relay coil CR13 are in series, contacts cr12a and cr13a, respectively, forming hold circuits across the first two mentioned contacts of each line.

Now, assuming that a second operation is at the point of completion, it will be evident that the micro-switch LP10 has fallen in the step-advance punch hole and its pair of contacts is, therefore, in the closed-open state shown in lines 1 and 2, FIG. 15, so that the relay coils CR10 and CR12 are energized, but when that operation is ended and the drum step instruction is effected the contact cr31b is opened, due to energization of relay CR31, line 2, FIG. 16, and the relay coil CR10 is de-energized. If the drum 43 positively rotates one pitch length, the micro-switch LP10 is operated, by movement of the card 44, to the 3rd operation, to close the "a" contact on the 2nd line, FIG. 15, and, after a set period of time, the contact cr31b is closed, as will be explained in connection with FIG. 16, as a result of which the relay coil CR11 will be energized to supply power to the circuits on the 2nd line and below. FIG. 14, through the contact cr11a on the 1st line of FIG. 14. But if the drum 43 does not rotate, the micro-switch LP10 "a" contact, on the 2nd line, FIG. 15, remains open, so that the relay coil CR11 remains un-energized, as a result of which the circuits on the 2nd line and below, FIG. 14, remain broken and the motor M2 is not started.

STEP ADVANCE CONTROL CIRCUIT (FIG. 16)

The set of relay contacts cr23a, cr40a, connected in parallel by power lines 110, 150 is further connected in series to the circuits forming the 2nd line and below of FIG. 16. On the 2nd to 7th lines, the contacts cr1a–cr6a are respectively connected in branch series with both "a" and "b" contacts of the stop-motion micro-switches LS11–LS16, and all of the circuits connected to the "a" contacts of these switches are connected in parallel and, through the contact cr32a, to the relay coil CR31 and line 200, while on the other hand, all of the circuits connected to the above-mentioned "b" contacts are connected in parallel with each other and in series with the relay coil CR32 to power line 200. A self-hold circuit for relay coil CR31 is formed by the contact cr31a and the timer contact tr3b, in line 1 of FIG. 16, the relay coil CR32 also forming a similar independent holding circuit including the micro-switch LS30 and the self contact cr32a in lines 8 and 9.

The 9th line proper is the self-stepping circuit, in which the micro-switch LS30 and the contacts cr25a, cr22b, cr23b are connected in series with the timer coil TR4, adapted to repeat, at fixed intervals, energization and de-energization of the coil SOL1 of the electromagnet 58, so as to make the drum 43 step by itself to its original index position at the completion of a program. This occurs as follows: The timer coil TR4 is energized and, after time-up, closes the self contact tr4a on the 12th line, FIG. 16, to energize the electromagnet 58 or 80 of the coil SOL1. As a result of this, the lever 59 of FIG. 5 is turned to press the micro-switch LS30, so that the timer coil TR4 and the coil SOL1 are de-energized and the lever 59 returns to its former position. When the lever 59 returns to the former position, LS30 closes and repeatedly energizes and de-energizes at determined intervals. In this way, the ratchet gear 51 and the drum 43 are advanced self-stepping pitch-by-pitch. When the drum 43 returns to its original position, the micro-switch LS31 acts and de-energizes the relay coil CR25.

The circuits on the 10th to 12th lines are for controlling SOL1 of the electromagnet 58 of the program step-advancing device. The contacts cr22b, cr31b, and switch PB1, which interlocks with the start button, same reference of FIG. 13, line 3, together with coil SOL1 are connected in series between power lines 150 and 200 to form a circuit. The contact cr31a leading from the electric wire 110 and the timer contact tr4a of the aforementioned self-stepping circuit are connected in parallel and as a set to a junction point between switch PB1 and the coil SOL1.

The circuit on the 10th line is adapted to energize the coil SOL1 at the time of program start operation, and thus make the drum step-advance one pitch length from the original index position. The circuit on the 11th line energizes the coil SOL1 only when a dog has actuated a stopping micro-switch LS11–16 during automatic operation, de-energizes it on time-up of the timer TR3, and makes the drum step-advance one pitch at the termination of each operation. The circuit on the 12th line functions to step the drum to the original index position by action of the timer TR4 in line 9 at the end of a cycle or program of operations.

CLUTCH CONTROL CIRCUIT (FIG. 17)

In lines 1 and 2 the transformer T1 is connected across the rectifier bridge Se1 in line 3 for supplying the appropriate direct current to the clutch coils of the aforesaid circuits. To the coil of the clutch CX, line 4, are connected in series the contacts cr1a and cr2a in parallel with one another. To the coil of the clutch CY there are similarly connected the contacts cr3a and cr4a in line 5. A similar circuit in line 6 connects the coil of the clutch CZ to the contacts cr5a and cr6a. In line 7 the coil of the clutch CB is connected in series with the contact cr8a. In line 8 the coil of the clutch CF is connected in series to the contacts cr8b, cr7b, and to the coil of the clutch CR the contacts cr8b and cr7a are connected in series.

OPERATION OF THE PROGRAM CONTROL APPARATUS

On the punch card 44 or the slit plate 47 there are provided holes 44a, 44b or a notch 47a sufficiently large for the dropping in of the actuators of the reading micro-switches LP1–LPn, to read instructions for feed, rapid feed, fine feed, jump-over, etc., of each operation to be commanded in accordance with the predetermined details and sequence of operation of the machine. This punch card or slit plate is mounted and fixed on the drum 43. Here, assume that the drum is in its indexed original position as a result of the micro-switch LS31 having been actuated at the end of the previous program, and that the dogs previously described are properly positioned in accordance with the desired feed movements of each of the operation steps.

When power is supplied to the lines 100, 200, FIG. 13, the relay coil CR21 is energized and electric line 110 from the 3rd level downward is also supplied with the current through closing of contact cr21a. On switching the change-over switch So in line 3 to "automatic" and pushing the start button PB1, the relay coils CR23, CRM1 are energized, and immediately upon their operation, the line 110 and the line 150 of FIG. 16 are supplied current, the latter through closing of contacts cr23a.

In the original position of the drum 43, the set of reading micro-switches LP1–LP10 are opened on their back or "b" contacts so that the relay CR11 in FIG. 15 is energized by movement of LP10 to close its front or "a" contact upon advance of the card to the first operation position, and power is supplied to the line 130 of FIG. 14.

While the start button PB1 on the 10th line of FIG. 16 is pushed closed, the coil SOL1 continues to be energized, turning the lever 59 of FIG. 5 to the position of the broken line. When the button BP1 is released, the coil SOL1 is de-energized, with the result that the lever 59 reverts to its full line position under action of the spring 61, causing the pawl 60 to step-advance the drum 43 to the position for the 1st operation.

Referring to the operations punched into card 44 shown in FIG. 10, the reading micro-switches LP6 and LP8 drop in the holes and their front or "a" contacts are closed.

The timer coil TR3 on the 8th line of FIG. 13 is energized simultaneously with the supply of power and, after a determined time, closes the contact $tr3a$, 55, FIG. 14, so that the relay coil CR6 on the 7th line of FIG. 14 is energized and held, but the relay CR8 on the 8th line is not energized unless LS6 connecting the same to the 7th line is closed.

In FIG. 17, lines 6 to 8, the coil of the clutch CZ is energized through the contact $cr6a$ and the coil of the clutch CF is energized through the contacts $cr8b$, $cr7b$.

On the 6th and 7th lines of FIG. 13, the timer coil TR2 is energized through the contact $cr6a$ closing and, after a determined period of time necessary for the complete engagement of the clutches CZ, CF, the contact $tr2a$ closes to energize CRM3 and rotate the feed motor M2 in reverse direction. This rotation is transmitted from the clutch CF of FIG. 2 to the safety clutch CS, thence to the gears 11, 14, 15, 16, 19, to the clutch CZ and to the spindle-head up-down feed device 20, to effect the slow downward feed of the spindle-head 6. When, in the immediate proximity of the lower extremity of the downward feed, the dog $29i$ fixed on the dog rail 27 pushes the motion-responsive lever of the micro-switch box 33 and closes the micro-switch LS6. The relay coil CR8 on the 8th line of FIG. 14 is thus energized and change-over is made in FIG. 17 from the clutch CF to the clutch CB for fine feed. Upon reaching the lower extremity of downward feed, the dog located at this position closes the "a" contact of micro-switch LS16, FIG. 16.

In the previous condition of the circuit of FIG. 16, the contact $cr6a$ being closed, the relay coil CR32 was energized from the "b" contact of the micro-switch LS16 and was held closed by self contact $cr32a$. In consequence, when the micro-switch LS16 is restored, through closing of its front contact "a," the relay coil CR31 is energized, resulting in de-energizing of the relay coil CRM3 on the 7th line of FIG. 13 and suddenly stopping the main feed motor M2. At the same time, through the step-advance circuit on the 11th line of FIG. 16, relay contact $cr31a$ closes and energizes the coil SOL1, turning the lever 59 of the step-advance mechanism. Simultaneously with the stop of the feed motor M2, the timer coil TR3 on the 8th line of FIG. 13 is energized and, immediately on the timing-up, it de-energizes the relay coil CR31, FIG. 16, lines 1 and 2, and the coil SOL1, 11th line of FIG. 16, resulting in the step-advance of the drum 43 for the 2nd operation.

By the turning of the lever 59 the micro-switch LS30, FIG. 5, is opened to de-energize the relay CR32, lines 8 and 9, FIG. 16. When the drum step-advances one pitch to the 2nd operation, the micro-switch LP10 is restored to make its back contact "b," de-energizing relay CR11, FIG. 15, and opening the electric line 130, FIG. 14, but the relay coil CR10 is energized to supply the current again and to operate in the same way described above for CR11. If, however, the drum 43 does not rotate normally and for a full step, CR13, line 4, FIG. 15, continues to be energized opening line 2 to relay CR11, and since switch LP10 remains unrestored neither of the relays CR10, CR11 is energized, resulting in preventing the next operation. Thus, until after it is confirmed for each operation whether or not the step-advance of the program has been positively effected, the next operation is not started. In this way, all false motions of the machine tool are prevented and this is an important characteristic of the invention.

When card 44, FIG. 10, is stepped to the 2nd operation, the micro-switches LP1, LP7, LP8 are restored to make condition with the result that the relay coils CR1 and CR7, CR8, FIG. 14, are energized and the table is rapidly fed in the leftward direction. The rapid feed cannot be effected unless LP8 is restored together with LP7, so that even if LP7 is opened and contact is subsequently restored, rapid feed is not effected unless LP8 is also restored, this arrangement helping to ensure the perfect safety of operation.

Effectuation of the remaining steps commanded by card 44, FIG. 10, are performed in the above-described manner to perform the operations diagrammed in FIG. 11 until the entire program sequence is completed.

The following description covers the jump-over. Where the program includes many operations so that a similar tool or table movement occurs more than once, many dogs are fitted on one dog rail. There being only one micro-switch provided for one and the same feed direction, it is thus possible that in a certain operation the limit switch may be actuated by the wrong dog to improperly feed or stop at the wrong point. For instance, in the 7th–8th operations shown in FIG. 11, the dog intended for directing the stop of the feed of the 2nd operation interferes, as indicated by the dash-dot line 7', with the subsequent 7th operation. In such case, and in order to make the drum step-advance without improperly stopping the feed, there should be a jump-over hole punched in the 7th row of the punch card 44 to actuate, or restore, switch LP9 the jump-over switch. Thus, in the 7th operation, LP9 is restored by the punch hole shown to energize the relay coil CR9, line 11, FIG. 14, and independently of relay CR31, coil CR9 continues to energize the relay CRM2 or CRM3 on the 7th line of FIG. 13, thereby preventing mid-stroke stop of the feed.

At this point it is well to explain the circuit provision which allow readjustment of the dogs. When the change-over switch So, line 3, FIG. 13, is turned from "automatic" to "dog readjustment" position, relay CR23 is de-energized and its contact $cr23a$ is opened, resulting in the electric lines 120, 130, 150 of FIGS. 14–16 being opened and the automatic cycle stopped. Then, if the dog readjustment button PB3 on the 18th line of FIG. 14 is pressed, the relay coil CR40 is energized and becomes self-held, power then being supplied to the circuits on the 12th line and downward of FIG. 14 and to the step-advance directing circuit of FIG. 16.

In this state, if for instance the dogs 25a–25i controlling the forward advance stroke of the spindle-head are to be readjusted, the change-direction switch S3, line 13, FIG. 14, should be closed to energize the relay coil CR3, whereupon the spindle-head will be advanced forward. When the determined dog 25i causes the micro-switch LS13, FIG. 16, to operate, the relay coil CR31 will be energized to open the contact $cr31b$ and de-energize the relay coil CR40 on the 18th line of FIG. 14, with the result that the lines 140, FIG. 14, and 150, FIG. 16, are opened and the forward advance of the spindle-head 6 will be stopped. Then the operator measures this stopping position with an indicator, or the like, and, detecting its error against the required stop position, corrects the position of the dog in question accordingly. Thereafter the operator repeats the same operation with the dog whose position has been corrected, to check the adjusted stopping position of the dog. The operator is thus able to readjust the position of the dog as many times as necessary, each time pressing again the dog readjustment button PB3 to energize the relay R40 and supply the current to the circuits on the 12th line and below of FIG. 14, as well as to the circuits of FIG. 16. After first closing the changedirection switch S4, line 16, FIG. 14, to make the spindle-head recede, change-over may be made to S3 to make the spindle-head advance. When the dog 25i actuates the micro-switch LS13, relay CR31 is operated and relay CR40 is de-energized and the feed is again stopped. For other feed directions, readjustment of the dog positions can be effected in the same manner.

As described above, at the time of readjustment of the dogs, the change-over switch So is turned to the "dog readjustment" position and by the manipulation of the push button switch PB3 and the change direction switches S1–S6 the same operation can be repeated any desired number of times. And, as feed is stopped at the position where the dog to be readjusted has pressed the determined micro-switch, it is sufficient to measure this stop position in order to correct the position of the dog. Moreover, as repetition of the same motion can be made in an easy and simple manner, the operation of the dog readjustment is greatly facilitated, thereby saving a great deal of time in this readjustment of the machine tool.

A further advantage is that if an emergency stop occurs midway or at any time in the course of automatic operation, change-over may be made to the "dog readjustment" and feed direction commanded for each operation by use of the change-over switch, making it possible to continue to work in sequential order for the rest of the program. There is no need to start the automatic cycle again from the 1st operation.

Still further, as the device contemplated by the present invention is easily mountable, detachable and replaceable for a differently programmed drum, besides being so constructed as to permit easy adjustment of the dogs, it can cope with greatest facility with program changes which are so frequently needed.

In addition, even when by mistake more than one feed-direction instruction has been issued, the interlocking circuit 54 detects the mistake and immediately stops the feed, thus preventing false motions of the machine and helping, together with the various circuits previously described, to perfectly secure the safety and protection.

It should be noted that to aid understanding of the invention, the descripiton of the operations of circuits of FIGS. 13 to 16 was made chiefly by referring to automatic cycling, yet separate operations of a program may be performed easily and additional operations can be added by adding appropriate circuits without inconvenience.

Concerning the described contacts of the timer, simplicity has required exemplification by use of multi-contacts, but it is possible to use separate relay and timers with but single sets of contacts. Construction of the machine is not limited to that shown in FIG. 1, the invention being applicable equally to program controls involving but one or two feed directions, as well as the three described.

It should also be added, that there is no special reason for describing control by either a punch card 44 or a slit plate 47, but that when the quantity of workpieces to be worked is large, use of the punch card is more convenient, and where program changes are frequent, it is advantageous to use the slit plate which can be easily attached and detached. The holes on the punch card and the notches on the slit plate perform the same function, and the appelation "groove" is used to inclusively designate both.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. In apparatus for automatic control of a machine tool of the type having a movable element, such as cutter supporting means and table, and drive means for said element adapted to feed and operate the element at determined speeds in determined directions and for determined distance to perform a series of work operations in accordance with program instructions, the improvements comprising a drum adapted to carry a program instructions on its periphery, means for rotating said drum step-by-step in angular increments to expose successive operation instructions of a program carried in lines on the drum periphery, a set of instruction reading switches arranged for actuation by each line of a program carried on the drum, a guide extending in a direction parallel to the feed of said movable element toward a stationary element and fixed to one of said elements, a set of dogs movable along said guide and fixable thereon at predetermined distance from a reference index, a set of switches installed on the other of said elements being actuated in response to contact with said dogs during movement of said movable element vis-a-vis the stationary element, and electric circuit means connecting both said sets of switches to said drive means and operable upon actuation of said instruction reading switches to cause initiation, direction and speed of feed of said movable element, and upon actuation of said switches being actuated by said dogs to cause the change of speed and stoppage of said movable element and step-advance of said drum.

2. In apparatus for automatic control of a machine tool, the improvements according to claim 1 wherein said machine tool includes a plurality of movable elements which are relatively movable in directions at right angle to one another, the drive means being adapted to individually drive all of said elements, there being a plurality of guides each extending in a direction parallel to the feed of one of said movable elements toward one of a plurality of stationary elements and fixed to one of said movable and stationary elements, a plurality of sets of dogs, each set being movable along one of said guides and fixable thereon at predetermined distance from a reference index, a plurality of sets of switches, each set of switches being installed on the other of said corresponding movable and stationary elements and being actuated in response to contact with said dogs during movement of the movable element vis-a-vis said stationary element, and electric circuit means connecting all said sets of switches to said drive means and operable upon actuation of said instruction reading switches to cause initiation, direction and speed of feed of said movable elements, and upon actuation of said switches being actuated by said dogs to cause the change of speed and stoppage of said movable elements and step-advance of said drum.

3. In apparatus for automatic control of a machine tool, the improvements according to claim 1 wherein said electric circuit means includes means for stopping the drive for said movable element as the drum is advanced each step to initiate the next operation in the program if the drum does not properly complete its angular increment of rotational movement.

4. In apparatus for automatic control of a machine tool, the improvements according to claim 3 wherein said means for rotating said drum step-by-step comprises an electromagnet linked to a pawl engaged with a ratchet secured to the drum, said electromagnet being energized by a circuit, forming part of said electric circuit means and including relays and a set of microswitches having "a" contacts connected in parallel and in series with one of said relays and having "b" contacts connected in parallel and in series with another of said relays, whereby said relay connected in series with said "b" contacts forms an interlock circuit with said relay connected in series with said "a" contacts, and said electromagnet is energized when one of said "a" contacts of the microswitches is actuated so as to command advancing said drum.

5. In apparatus for automatic control of a machine tool, the improvements according to claim 2 wherein is additionally provided electric circuits for stopping feed movement of said movable elements, such as a cutter supporting means and table, at the end of each stroke, said circuits including manually operable switches which enable feed drive connection to said movable elements to move the same in a desired direction for a desired distance before the next operation of the program is initiated.

6. In apparatus for automatic control of a machine tool, the improvements according to claim 2 wherein said electric circuit means includes means for commanding rapid feed of the movable elements, said last means including two switches from said set of instruction reading switches, one for the fine feed and one for the rapid feed, and both of which must be actuated to effect said rapid feed.

7. In apparatus for automatic control of a machine tool, the improvements according to claim 2 wherein said electric circuit means includes a relay interlocking circuit arranged to prevent command of feed of a movable element in more than one direction at a given time.

8. In apparatus for automatic control of a machine tool, the improvements according to claim 2 wherein said electric circuit means includes a motor for driving the feed of each of said movable elements, and a start/stop circuit for each of said motors including elements controlled by an additional instruction reading switch which retains the motor energized even though commanded to stop the feed by actuation of a commanding feed stop switch actuated by a dog intended to control a different operation, whereby during feed in the same direction intermediate stops during an operation are prevented by a predetermined program instruction to be read by said additional instruction switch.

9. In apparatus for automatic control of a machine tool, the improvements according to claim 2 wherein said electric circuit means includes an electro-mechanical step-advancing mechanism, said mechanism comprising a driving shaft adapted to be step-advanced at a unit angle by an electromagnet linked to ratchet means carried by said shaft, said drum being detachably mounted at one end of said driving shaft, said set of instruction reading switches being mounted on a detachable support and so arranged as to lie along the periphery of the drum for actuation by program instructions carried thereby, said support being displaceable to permit easy detachment and replacement of the drum without detachment and removal of said support and instruction reading switches.

References Cited
UNITED STATES PATENTS

| | | | |
|---|---|---|---|
| 2,118,170 | 5/1938 | Crowley et al. | 318—162 XR |
| 2,656,497 | 10/1953 | Schweighofer et al. | 318—162 XR |
| 2,830,150 | 4/1958 | Rockwell | 335—140 XR |
| 3,061,764 | 10/1962 | Paul et al. | 318—162 XR |
| 3,101,435 | 8/1963 | Welch et al. | 307—141.4 XR |

BENJAMIN DOBECK, Primary Examiner

U.S. Cl. X.R.

307—141.4; 335—140